United States Patent [19]

Heater, Jr. et al.

[11] Patent Number: 4,496,673
[45] Date of Patent: Jan. 29, 1985

[54] CROSSLINKABLE POLYESTER BODY SOLDER OF POWDERED METAL

[75] Inventors: Paul L. Heater, Jr., Massillon; Nelson C. Bletso, Kent; William C. T. Tung, Tallmadge, all of Ohio

[73] Assignee: The Goodyear Tire & Rubber Company, Akron, Ohio

[21] Appl. No.: 432,204

[22] Filed: Oct. 1, 1982

[51] Int. Cl.$^3$ ................................................ C08K 3/08
[52] U.S. Cl. ...................................... 523/458; 523/457
[58] Field of Search .............. 523/457, 458, 459, 440, 523/442

[56] References Cited

U.S. PATENT DOCUMENTS

| 4,145,370 | 3/1979 | Sreeves | 523/459 |
| 4,200,566 | 4/1980 | FitzGerald et al. | 523/440 |
| 4,223,097 | 9/1980 | Johannes et al. | 523/440 |
| 4,264,751 | 4/1981 | Scheibelhoffer | 525/437 |
| 4,370,452 | 1/1983 | Heater | 525/438 |

FOREIGN PATENT DOCUMENTS 801986  9/1958  United Kingdom ............... 523/457

Primary Examiner—Lewis T. Jacobs
Attorney, Agent, or Firm—J. D. Wolfe; R. D. Thompson

[57] ABSTRACT

A blend of about an equivalent of a carboxyl terminated polyester having a carboxyl end group equivalent weight of 900 to 1200 with 0.8 to 1.2 equivalents of an epoxy curing agent having an equivalent weight of about 70 to 1000, 0 to 50% by weight of a copolyester melt adhesive and sufficient powdered metal to make 20 to 70% but preferably about 30 to 50% metal by weight based on recipe without the copolyester melt adhesive.

3 Claims, No Drawings

CROSSLINKABLE POLYESTER BODY SOLDER OF POWDERED METAL

TECHNICAL FIELD

This invention relates to a crosslinkable polyester solder suitable as a body solder for vehicles, said solder being free of lead. More particularly this invention relates to a crosslinkable polyester powdered metal loaded composition that exhibits a plastic nature in the temperature range of 150° to 300° C. rather than being a liquid or a solid which permits the solder to be applied with a spatula or other means without sag on vertical surfaces.

BACKGROUND

The major automobile manufacturers have used a lead based body solder to fill depressions in car bodies such as between the roof and rear fenders before the car bodies are painted. These solders generally are alloys of lead with tin or antimony. These solders have a temperature melting range that permits the solder to be melted and applied to the body with a spatula before the solder solidifies. On cooling the solder solidifies and can be sanded smooth to a feathered edge before painting.

The metal in this solder, viz lead, tin and antimony, are of high atomic weight and generally considered to be highly toxic. Consequently the automobile companies and others have attempted to develop body solders of an organic base that were free of these metals.

DISCLOSURE AND PRACTICE OF THE INVENTION

We have discovered that a blend of a carboxyl terminated polyester having an equivalent weight of 900 to 1200, an epoxy curing agent, and optionally a copolyester melt adhesive as plasticizer and powdered metal yields a composition that can function as a body solder. We have discovered that the blend of this invention has a viscosity that permits the hot blend to be applied to vertical surfaces without sag and on cooling sets to a solid that can be sanded to a feathered edge without appreciable blocking or filling of the sandpaper or cloth. Also, the sanded surface can be painted to give a smooth no blemish surface.

A blend of about an equivalent weight of a carboxyl terminated polyester having a carboxyl end group equivalent weight of 900 to 1200 with a 0.8 to 1.2 equivalent weight of an epoxy curing agent having an equivalent weight of about 70 to 1000, 0 to 50% of a copolyester melt adhesive, and the balance of a metallic powder has proved satisfactory for this invention.

This new body solder is easy to make by blending the ingredients together. Care should be taken to see the powdered metal does not burn. This can be achieved by blending the ingredients cold and then heating to melt the polyester and the optional melt adhesive, or mix in small batches or use a reduced or oxygen free atmosphere for the blending. For instance, small batches are readily made in a beaker on a hot plate by hand stirring, but for large batches a high shear mixer is quite adequate.

The epoxy curing agents useful in this invention are represented by the folliwing representative agents, triglycidyl isocyanurate, diglycidyl of Bis-phenol A and those readily available commercially.

The carboxyl terminated polyesters useful in this invention have a carboxyl equivalent weight of 900 to 1200 and preferably 1000 to 1100. Representative examples of the carboxyl terminated polyesters are those available under trade name VPE-6059, trimellitic acid terminated polyester of neopentyl glycol and terephthalic acid containing 88 mol percent terephthalic acid and 12 percent of trimellitic acid and an equivalent weight of 10 to higher. Also carboxyl terminated polyesters are well known to those of ordinary skill to the trade as shown by U.S. Pat. No. 4,264,751 and the copending U.S. application Ser. No. 223,972 filed Jan. 12, 1981, now U.S. Pat. No. 4,370,452, issued Jan. 25, 1983, in name of Paul L. Heater. Also, the above patent and patent disclosure discloses the epoxy compositions useful in this invention.

The many melt adhesives useful to make the blends of this invention are represented by the following terpolymer of tetramethylene glycol with terephthalic acid, isophthalic acid and azelaic acid in ratios of 100/50/20/30 having an intrinsic viscosity of 0.05 to 1.0 measured at 30° C. in 60/40 phenol/tetrachloroethane and a melting point of 125° to 145° C. and available under the trade names VAR-5898 and VPE-5595.

The powder metals preferably should have a particle size of from 0.2 to 150 microns and the powdered irons and aluminium are the preferred metals.

The nature of this invention can be more readily understood by reference to the following examples wherein all parts and percentages are by weight unless otherwise indicated.

EXAMPLE 1

Solder was made by using a liquid curing agent, Dow Chemical Company Epoxy Resin 331 ™, having an epoxy equivalent weight of 182–190, stirred into an equivalent amount of a carboxyl terminated resin, viz VPE 6059 together with a polyester melt adhesive, viz VAR-5898 or VPE-5595, in amounts, viz 30 and 50 percent, listed in Table I. Each of the solder blends was tested for gel time by placing the solder on a gel plate at 204° C. and time for gellation was determined.

TABLE I

| Blend No. | Polyester Melt Adhesive | Percent | Gel Time Seconds |
|---|---|---|---|
| 1 | 5898 | 30 | 313–340 |
| 2 | 5898 | 50 | 360–525 |
| 3 | 5595 | 50 | 550 |
| 4* | 5898 | 30 | 85–120 |
| 5** | 5989 | 30 | 40–55 |

*Contains benzyl trimethyl ammonium chloride as a catalyst.
**Contains boron trifluoride monoethylamine complex as a catalyst.

EXAMPLE 2

A number of solder blends were made using a solid epoxy curing agent, Dow Chemical Company's DER 661 ™, having epoxy equivalent weight of 575 to 975, by hand mixing the ingredients in a beaker using the following recipe.

5 Parts Resin VAR 5898
1.55 Parts DER 661 ™
3.45 Parts Resin VPE 6059

The resulting blend was melted and mixed for three minutes. This mixture gelled in seven minutes at 204° C. on the gel plate.

EXAMPLE 3

A new solder was made by dry blending 58 parts of a melt adhesive, VAR 5898, 3.45 parts of a carboxyl terminate polyester, VPE 6059 and 1.55 parts of an epoxy resin, Dow Chemical Company's DER 661 TM, having an equivalent weight of 575 to 975. The blend was warmed to melt and fluidize the ingredients and mixed in the molten state for three minutes before being cooled. The mixture gelled in about 7 minutes at 207° C. on the gel plate.

Two 2.5 part dry blends using DER 661 TM epoxy resin ground to pass a 10 mesh screen was mixed on a ball mill according to the following recipe: 1.25 parts VAR-5898, 0.865 parts VPE-6059 and 0.38 parts of DER 661 TM and then mixed in a heated mill mixer with 30% by weight of powdered aluminium to form a body solder.

The solder was evaluated using standard steel plates (7.22×19.2 cm) used for powder coating evaluation. The plates were impacted with an impact tester to produce five circular depressions or dimples in the plate each about 0.3 cm deep. The plates after impacting were cleaned with chloroform just prior to use to remove any dirt and grease.

The dimples produced in the test plates were filled with soften solder and smoothed by hand pressure using a Teflon TM sheet to keep the solder from sticking to the hand. The steel plate was resting on a hot plate during filling the dimple operation. After the steel plate had cooled, the solder could be hand sanded with emery cloth to a feather edge. The test plate was then placed in a bake oven at 400° F. (204° C.) for 30 minutes and on cooling showed no signs of distortion.

EXAMPLE 4

Other body solders were made with the recipe of Example 3 except the melt adhesive VAR 5898 was ommitted as there was no need for plasticizing and flexiblizing. These body solders were applied as a chunk to the dimples in the steel plate as the plate rested on a hot plate to melt the solder, and then the cooled solder was sanded smooth as described in Example 3.

The body solder made with or without a melt adhesive sanded smooth on the steel plates were immersed in a −40° C. bath for 10 minutes and then was immediately put in 200° C. oven for ten minutes. After five cycles of −40° C. and 200° C. treatments the solders showed no adverse effects to repeated sudden temperature changes. After the repeated temperature changes the teel plates were subjected to a 15 inch pound impact with a Gardner impact tester and showed no difference in impact effects compared to solder on plates before temperature cycling. Thus, the solder did not loose its adhesion to the metal.

In another test, an oil greased steel plate was coated with solder made with the melt adhesives and cured at 200° C. and sanded smooth. Good adhesion was obtained with this solder on an oily steel surface.

EXAMPLE 5

A body solder was made by mixing on a mill for 9 minutes the ingredients set forth hereinafter.

0.30 parts of powdered aluminium
0.21 parts of VAR 5898
0.087 parts of DER 661 TM
0.317 parts of VPE 6059
0.015 parts of TGIC TGIC is abbreviation for triglycidyl isocyanurate.

This solder had a gel time of 1–2 minutes at 200° C. cure temperature and could be sanded to a feathered edge.

Metal salts such as lithium acetate can be used as a catalyst to adjust the gel time of the solder. To illustrate the effect of lithium salts on cure or gel time see Example 6.

EXAMPLE 6

The body solder of Example 1 had varying amounts of lithium acetate as a catalyst incorporated therein where solder contained 30% and 50% by weight of the melt adhesive. Table II shows gel time at various temperatures at lithium acetate level shown on solder containing 30% melt adhesive.

TABLE II

| Temperature °C. | Level Lithium Acetate in Solder | Gel Time Minutes |
|---|---|---|
| 156–163 | 0 | — |
|  | 1 | 20 |
| 205 | 0 | 13–15 |
|  | 1 | 6 |
| 233 | 0 | 9 |
|  | 1 | 2.5 |

The preferred catalyst levels are 0.2 to 1% by weight.

EXAMPLE 7

The body solders such as those of Example 2 and Example 5 were applied to test panels as described in Example 3. These panels containing the body solder were placed in a cold room at −20° C. for ten days. Then the samples were removed from the cold room and on inspection no sign of cracks were observed. Also, the samples were fully cured and could be sanded if need be. Another set of metal plates were coated with an epoxy metal primer and then the body solder was applied and cured before the metal plates were placed in cold room at −20° C. for 20 days. These samples exhibited no adverse effects to 10 days in the cold room.

We claim:

1. A blend of about an equivalent weight of a carboxyl terminated polyester having a carboxyl end group equivalent weight of 900 to 1200 with an 0.8 to 1.2 equivalent weight of an epoxy curing agent having an epoxy equivalent weight of about 70 to 1000, copolyester melt adhesive, and 20 to 70% by weight of metallic powder selected from the class of iron and aluminum, said copolyester melt adhesive having an intrinsic visosity of 0.05 to 1.0 measured at 30° C. in 60/40 phenol/tetrachloroethane and a melting point of 125° to 145° C. to give a blend that adheres to metals and is sandable in solid state to a feathered edge.

2. A blend of about an equivalent weight of a carboxyl terminated polyester having a carboxyl end group equivalent weight of 900 to 1200 with an 0.8 to 1.2 equivalent weight of an epoxy curing agent having an epoxy equivalent weight of about 70 to 1000, an amount up to 50% of a copolyester melt adhesive, and the balance of a metallic powder selected from the class of iron and aluminum, said copolyester melt adhesive having an intrinsic viscosity of 0.05 to 1.0 measured at 30° C. in 60/40 phenol/tetrachloroethane and a melting point of 125° to 145° C. to give a blend that adheres to metals and is sandable in solid state to a feathered edge.

3. A blend of about an equivalent weight of a carboxyl terminated polyester having a carboxyl end group equivalent weight of 900 to 1200 with an 0.8 to 1.2 equivalent weight of an epoxy curing agent having an epoxy equivalent weight of about 70 to 1000, an amount up to 50% of a copolyester melt adhesive, and the balance of a metallic powder selected from the class of iron and aluminum, said copolyester melt adhesive is a terpolymer of the structure obtained by esterification of tetramethylene glycol with terephthalic acid, isophthalic acid and azelaic acid and their anhydrides to give a blend that adheres to metals and sandable in solid state to a feathered edge.

* * * * *